(12) United States Patent
Li

(10) Patent No.: US 10,095,065 B2
(45) Date of Patent: Oct. 9, 2018

(54) DISPLAY SUBSTRATE AND MANUFACTURING METHOD THEREOF, AND BISTABLE LIQUID CRYSTAL DISPLAY PANEL

(71) Applicant: BOE TECHNOLOGY GROUP CO., LTD., Beijing (CN)

(72) Inventor: Mingchao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 790 days.

(21) Appl. No.: 14/389,119

(22) PCT Filed: Nov. 11, 2013

(86) PCT No.: PCT/CN2013/086841
§ 371 (c)(1),
(2) Date: Sep. 29, 2014

(87) PCT Pub. No.: WO2015/014040
PCT Pub. Date: Feb. 5, 2015

(65) Prior Publication Data
US 2015/0309352 A1 Oct. 29, 2015

(30) Foreign Application Priority Data
Jul. 31, 2013 (CN) .......................... 2013 1 0329809

(51) Int. Cl.
*G02F 1/1337* (2006.01)
*G02F 1/139* (2006.01)
(Continued)

(52) U.S. Cl.
CPC ........ *G02F 1/133711* (2013.01); *C09K 19/02* (2013.01); *C09K 19/12* (2013.01);
(Continued)

(58) Field of Classification Search
CPC .. C09K 19/02; C09K 19/12; C09K 2019/122; C09K 2019/124; C09K 2019/125;
(Continued)

(56) References Cited

U.S. PATENT DOCUMENTS 7,471,369 B2 12/2008 Liang
2009/0268138 A1* 10/2009 Nakamura ........ G02F 1/133345
349/123
(Continued)

FOREIGN PATENT DOCUMENTS

CN 101566761 A 10/2009
CN 101649196 A 2/2010
(Continued)

OTHER PUBLICATIONS

Form PCT/ISA/237 issued in International Application No. PCT/CN2013/086841 dated May 27, 2014.
(Continued)

*Primary Examiner* — Sophie Hon
(74) *Attorney, Agent, or Firm* — Nath, Goldberg & Meyer; Joshua B. Goldberg

(57) ABSTRACT

The invention provides a display substrate and a manufacturing method thereof, and a bistable liquid crystal display panel, and belong to the field of bistable liquid crystal display technology, which can solve the problem of high transmittance in black state and low transmittance in light state in the conventional bistable liquid crystal display device. The display substrate of the invention comprises a base substrate and a biphenyl polymer layer provided on the base substrate. The manufacturing method of the display substrate comprises: applying biphenyl monomers on a base substrate; and applying an electric field parallel to the base substrate to the biphenyl monomers, so that the biphenyl monomers are polymerized into a biphenyl polymer layer.

(Continued)

The invention may be applied to a bistable liquid crystal display device, especially a bistable liquid crystal display device using cholesteric liquid crystal.

15 Claims, 1 Drawing Sheet

(51) Int. Cl.
    *C09K 19/38* (2006.01)
    *C09K 19/02* (2006.01)
    *C09K 19/54* (2006.01)
    *G02F 1/137* (2006.01)
    *C09K 19/12* (2006.01)
    *C09K 19/04* (2006.01)
    *G02F 1/1333* (2006.01)

(52) U.S. Cl.
    CPC ............ *C09K 19/38* (2013.01); *C09K 19/544* (2013.01); *G02F 1/1391* (2013.01); *G02F 1/13718* (2013.01); *G02F 1/133707* (2013.01); *C09K 2019/0448* (2013.01); *C09K 2019/122* (2013.01); *C09K 2019/124* (2013.01); *C09K 2019/125* (2013.01); *C09K 2219/03* (2013.01); *G02F 1/133305* (2013.01); *G02F 2001/133726* (2013.01); *G02F 2202/36* (2013.01); *Y10T 428/1005* (2015.01)

(58) Field of Classification Search
    CPC ........... C09K 2219/03; G02F 1/133305; G02F 1/133707; G02F 1/133711; G02F 1/13718; G02F 1/1391; G02F 2001/133726; G02F 2202/36; Y10T 428/1005; Y10T 428/1023
    See application file for complete search history.

(56) References Cited

U.S. PATENT DOCUMENTS

| | | | |
|---|---|---|---|
| 2010/0195008 A1* | 8/2010 | Hegmann | B82Y 20/00 349/33 |
| 2010/0238382 A1* | 9/2010 | Hsu | G02F 1/133788 349/86 |
| 2011/0102720 A1* | 5/2011 | Mizusaki | C08F 20/00 349/123 |
| 2012/0008079 A1* | 1/2012 | Mizusaki | B32B 27/34 349/124 |
| 2013/0021568 A1* | 1/2013 | Hsieh | C07C 69/653 349/127 |

FOREIGN PATENT DOCUMENTS

| | | |
|---|---|---|
| CN | 203376535 U | 1/2014 |
| CN | 103733127 A | 4/2014 |
| EP | 0915144 A1 | 5/1999 |

OTHER PUBLICATIONS

Office Action issued in Chinese Application No. 201310329809.4 dated May 26, 2015.
Search Report issued in International Application No. PCT/CN2013/086841, twelve (12) pages.

\* cited by examiner

DISPLAY SUBSTRATE AND MANUFACTURING METHOD THEREOF, AND BISTABLE LIQUID CRYSTAL DISPLAY PANEL

This is a National Phase Application filed under 35 U.S.C. 371 as a national stage of PCT/CN2013/086841, filed Nov. 11, 2013, and claims priority benefit from Chinese Application No. 201310329809.4, filed Jul. 31, 2013, the content of each of which is hereby incorporated by reference in its entirety.

TECHNICAL FIELD

The invention relates to the field of bistable liquid crystal display technology, particular to a display substrate and manufacturing method thereof, and a bistable liquid crystal display panel.

BACKGROUND ART

In a conventional liquid crystal display device, the liquid crystal molecules are in a stable state when no voltage is applied, and change their distribution states under applied voltage, since the liquid crystal molecules present different optical properties (reflection properties, polarization performance, and scattering performance, etc.) in above two states, the optical properties of the liquid crystal molecules can be controlled by controlling the applied voltage, thereby display can be realized. However, as in the conventional liquid crystal display device, the liquid crystal molecules only have one stable state, and another state has to be maintained by means of the voltage, therefore in order to display, it is necessary to continuously apply voltage, resulting in higher power consumption.

In order to reduce power consumption, a concept of bistable liquid crystal display device has been proposed, wherein the liquid crystal molecules have two steady states with different optical properties when no voltage is supplied, therefore the display can be maintained without supplying voltage and the voltage can be supplied only when switching the display images, thereby power consumption can be greatly reduced. For example, in absence of voltage, cholesteric liquid crystal have two steady states, that is, a focal conic texture structure and a planar texture structure, the liquid crystal molecules may be stabilized in the focal conic texture structure when they return to a state wherein no voltage is supplied after subjecting to a low voltage impulse and can scatter light rays (semitransparent, which corresponds to a light state), and may be stabilized in the planar texture structure when they return to a state wherein no voltage is supplied after subjecting to a high voltage impulse and can reflect light rays, the wavelength of the reflected light relates to the pitch of the liquid crystal molecules, therefore, the liquid crystal molecules may reflect all of the visible lights (which corresponds to a black state) by adjusting the pitch of the liquid crystal molecules. That is, without voltage, the cholesteric liquid crystal may exhibit two different states, that is, a reflecting state and a scattering state (that is, a semitransparent state), so that a bistable display can be realized. Of course, for a bistable liquid crystal display device, its driving method (which may be a passive driving method) can be different from those of conventional display devices, which will not be described in detailed here.

However, existing bistable liquid crystal display device has a high transmittance in black state, and a low transmittance in light state, thereby the contrast is low and the display effect is poor.

SUMMARY

With respect to problems to be solved, that is, existing bistable liquid crystal display device has a high transmittance in the black state, and a low transmittance in the light state, the present invention provides a display substrate and manufacturing method thereof, and a bistable liquid crystal display panel, which can provide a high transmittance in the light state and a low transmittance in the black state.

A solution for solving above problems is a display substrate which comprises a base substrate, and further comprises a biphenyl polymer layer provided on the base substrate.

The biphenyl polymer layer comprises a skeleton and meshes formed in the skeleton, and the meshes are uniformly distributed in the skeleton.

In addition to the biphenyl polymer layer, "base substrate" is provided with other well known display structures, such as a driving array, common electrodes, pixel electrodes, and color filters etc., so that the display substrate may has necessary functions for display. The "biphenyl polymer layer" refers to a polymer layer polymerized by monomers containing biphenyl group (the biphenyl monomers).

The display substrate of the invention comprises the biphenyl polymer layer, wherein liquid crystal molecules contacting the biphenyl polymer layer may be inserted into meshes of the biphenyl polymer layer. Since the meshes of the biphenyl polymer layer are uniformly distributed in a skeleton of the biphenyl polymer layer, the liquid crystal molecules contacting the biphenyl polymer layer can be distributed more uniformly by the biphenyl polymer layer, therefore, the bistable liquid crystal display device has a high transmittance in light state, and a low transmittance in black state, thereby the contrast is increased and the display effect is improved.

Preferably, the display substrate is a flexible display substrate.

Preferably, metal nanoparticles are distributed on the biphenyl polymer layer, wherein the metal nanoparticles are provided on the skeleton.

Further preferably, the metal nanoparticles include at least one of gold nanoparticles, silver nanoparticles and platinum nanoparticles. Further preferably, the grain size of the metal nanoparticle is 4~6 nm.

Preferably, the general formula of biphenyl monomers forming the biphenyl polymer is:

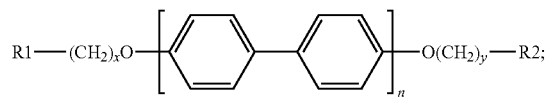

wherein, n is an integer selected from 1 to 3, x and y are integers selected from 1 to 7 respectively, and R1 and R2 are selected from —CH=CH$_2$, —OCH$_2$CH=CH$_2$, —CH$_2$NH$_2$, —CH$_2$COOH respectively.

Preferably, the biphenyl polymer layer is formed by polymerization of the biphenyl monomers under the influence of an electric field parallel to the base substrate, wherein the frequency of the electric field is 400~800 Hz; the electric field intensity is 0.75~1.25V/cm; and the polymerization time is 180~220 s.

Preferably, the aperture size of the mesh is 10±2 μm.

Preferably, the thickness of the biphenyl polymer layer is 1~2 μm.

A solution for solving above problems is a manufacturing method of a display device comprising:

applying biphenyl monomers on a base substrate; and applying an electric field parallel to the base substrate to the biphenyl monomers, so that the biphenyl monomers polymerize into a biphenyl polymer layer.

The biphenyl polymer layer comprises a skeleton and meshes formed in the skeleton, and the meshes are uniformly distributed in the skeleton.

In the manufacturing method of the display substrate, the biphenyl monomers are polymerized into the biphenyl polymer layer under the influence of an electric field, thereby the morphology (such as the mesh size) of the biphenyl polymer layer can be controlled by controlling the parameters of the electric field (for example, frequency), so that the biphenyl polymer layer may optimize the orientation of the liquid crystal molecules and thus the bistable liquid crystal display device has a high transmittance in the light state, and a low transmittance in the black state, thereby the contrast is increased.

Preferably, after forming the biphenyl polymer layer, the manufacturing method further comprises:

immersing at least the biphenyl polymer layer into suspensions of metal nanoparticles, so that metal nanoparticles are distributed on the biphenyl polymer layer in a dispersed manner.

Further preferably, the metal nanoparticles include at least one of gold nanoparticles, silver nanoparticles and platinum nanoparticles.

Further preferably, the grain size of the metal nanoparticle is 4~6 nm.

Further preferably, the concentration of the metal nanoparticles in the suspensions is 0.9~1.1 mol/L; and the immersing time is 4.5~5.5 h.

Preferably, the general formula of biphenyl monomers forming the biphenyl polymer is:

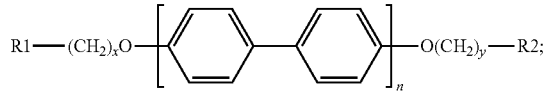

wherein, n is an integer selected from 1 to 3, x and y are integers selected from 1 to 7 respectively, and R1 and R2 are selected from —CH=CH$_2$, —OCH$_2$CH=CH$_2$, —CH$_2$NH$_2$, —CH$_2$COOH respectively.

Preferably, the frequency of the electric field is 400~800 Hz; the the electric field intensity is 0.75~1.25V/cm; and the polymerization time is 180~220 s.

A solution for solving above problems is a bistable liquid crystal display panel comprising a first display substrate and a second display substrate which are aligned and assembled, and a liquid crystal layer provided between the first display substrate and the second display substrate, wherein the first display substrate is the above display substrate, and a biphenyl polymer layer of the first display substrate faces the liquid crystal layer, and/or the second display substrate is the above display substrate, and a biphenyl polymer layer of the second display substrate faces the liquid crystal layer.

The two display substrates of a bistable liquid crystal display panel are different in function, for example, one of the display substrates may be used as a driving substrate, and the other may be used as a color filter substrate.

In the bistable liquid crystal display panel of the invention, at least one display substrate is the above display substrate with the biphenyl polymer layer, therefore, it can improve the distribution of the liquid crystal molecules, so that the transmittance thereof is high in the light state, and is low in the black state, thereby the contrast is increased.

Preferably, the liquid crystal layer comprises cholesteric liquid crystal.

The invention may be applied to the bistable liquid crystal display device, especially to the bistable liquid crystal display device using the cholesteric liquid crystal.

Figure 1:
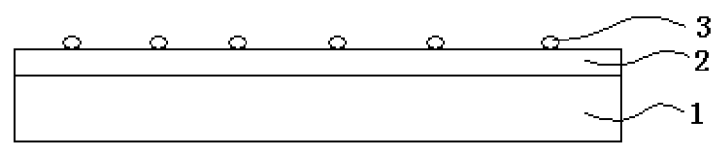
FIG. 1 is a cross-section structural diagram of a display substrate according to embodiment 1 of the invention.

REFERENCE NUMERALS 1. base substrate; 2. biphenyl polymer layer; 3. metal nanoparticle; 4. liquid crystal molecule; 5. polarizing film; 6. frame sealing glue.

DETAILED DESCRIPTION OF THE PREFERRED EMBODIMENTS

In order to make a person skilled in the art understand solutions of the invention better, the invention will be described in detail below in conjunction with drawings and embodiments.

Embodiment 1

As shown in FIG. 1, the present embodiment provides a display substrate and a manufacturing method thereof.

The display substrate comprises a base substrate 1, on which conventional display structures (for example, a driving array, a common electrode, a pixel electrode, and color filters) are provided, as these display structures are known and various, detail description thereof will be omitted here.

A biphenyl polymer layer 2 (that is, a polymer layer polymerized by monomers containing biphenyl group) is provided on the base substrate 1, the biphenyl polymer layer 2 comprises a skeleton and meshes formed in the skeleton, and the meshes are uniformly distributed in the skeleton.

The liquid crystal molecules may be inserted into the meshes of the biphenyl polymer layer 2 when they contact with the biphenyl polymer layer 2, since the meshes are uniformly distributed in the skeleton, the liquid crystal molecules contacting with the biphenyl polymer layer 2 are distributed uniformly. It can be seen from above that, the biphenyl polymer layer may change a distribution direction of the liquid crystal molecules contacting the biphenyl polymer layer, so that the liquid crystal molecules may distributed more uniformly, and thus performances of the bistable liquid crystal display device in the black state and light state can be improved.

In the invention, there is no special limitation to the thickness of the biphenyl polymer layer 2 provided on the base substrate 1, and preferably, the thickness of the biphenyl polymer layer 2 is 1~2 μm. Through a research, it is found that the biphenyl polymer layer 2 with a thickness of 1~2 μm can improve the distribution of the liquid crystal molecules better.

Preferably, the general formula of biphenyl monomers forming the biphenyl polymer is:

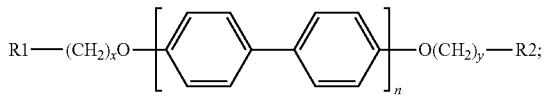

wherein, n is an integer selected from 1 to 3, x and y are integers selected from 1 to 7 respectively, and R1 and R2 are selected from —CH=CH$_2$, —OCH$_2$CH=CH$_2$, —CH$_2$NH$_2$, —CH$_2$COOH respectively.

In order to make the liquid crystal molecules contacting with the biphenyl polymer layer 2 distributed more uniformly and reasonably, the aperture size of the mesh of the biphenyl polymer layer 2 is preferably 10±2 μm. In this case, two to three liquid crystal molecules may be inserted into each mesh of the biphenyl polymer layer 2, the liquid crystal molecules contacting with the biphenyl polymer layer 2 may be distributed more uniformly by separation of the skeleton of the biphenyl polymer layer 2.

Specifically, the biphenyl polymer layer 2 may be formed by polymerization of the biphenyl monomers under influence of an electric field parallel to the base substrate 1, that is, the biphenyl monomers are polymerized by means of the applied electric field of certain frequency, so as to form the biphenyl polymer layer 2. When the biphenyl monomers are polymerized by means of the electric field parallel to the base substrate 1, the electric field causes the direction of the electron cloud of the biphenyl polymer layer 2 to be parallel to the base substrate 1, when the biphenyl polymer layer 2 contacts with the liquid crystal molecules, the electron cloud of the biphenyl polymer layer 2 and the electron cloud of the liquid crystal molecules interact with each other, so that the liquid crystal molecules contacting with the biphenyl polymer layer 2 has an initial state parallel to the base substrate 1, which is a good initial state.

The morphology of the biphenyl polymer layer 2 (such as the mesh size) is associated with the parameters of the electric field (for example, frequency), therefore, an optimal biphenyl polymer layer 2 can be obtained by controlling the parameters of the electric field. For example, in order to make aperture size of the mesh of the biphenyl polymer layer 2 be 10±2 μm, preferably, the parameters of the electric field are as follows:

the frequency of the electric field is 400~800 Hz;
the electric field intensity is 0.75~1.25V/cm; and
the polymerization time is 180~220 s.

Specifically, the electric field may be formed in various manners, for example, the electric field may be applied through leads in the display structures on the base substrate 1; alternatively, the electric field may be applied by additional electrodes attached to the base substrate 1, details of which are omitted here.

Preferably, there are metal nanoparticles distributed on the biphenyl polymer layer 2 in a dispersed manner, that is, there are metal nanoparticles in nano level distributed on the biphenyl polymer layer 2, and these metal nanoparticles do not overlap with each other. It should be understood that the metal nanoparticles are provided on the skeleton of the biphenyl polymer layer 2.

Figure 2:
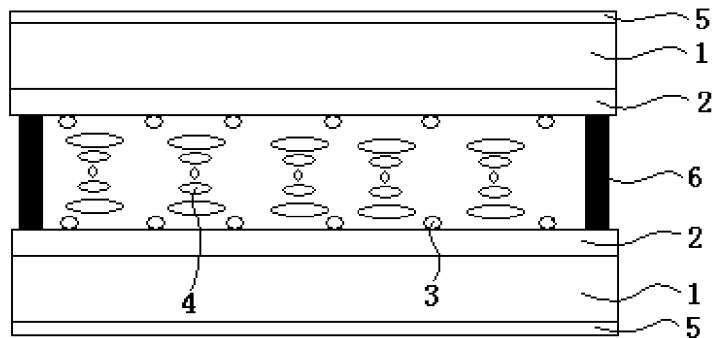
FIG. 2 is a cross-section structural diagram of a bistable liquid crystal display panel in a black state according to embodiment 2 of the invention.

As shown in FIG. 1 and FIG. 2, the metal nanoparticles 3 protrude from the biphenyl polymer layer 2, so that the nanoparticles 3 may further separate the liquid crystal molecules, and thus the distribution morphologies of the liquid crystal molecules can be further improved. Preferably, the interval between two adjacent metal nanoparticles may be 10±2 μm (that is, metal nanoparticles are provided at two sides of the mesh of the biphenyl polymer layer 2).

Preferably, the metal nanoparticles 3 include at least one of gold nanoparticles, silver nanoparticles and platinum nanoparticles.

Preferably, the grain size of the metal nanoparticle is 4~6 nm.

Preferably, the display substrate is a flexible display substrate, that is to say, the base substrate 1 of the display substrate and display structures on the base substrate 1 are made of flexible material, so as to form a flexible display device. Since the biphenyl polymer layer 2 of the invention is flexible, i.e., it is bendable, therefore it is especially applicable to the flexible display device.

The embodiment also provides a manufacturing method of the above display substrate, which comprises following steps:

S01, forming other known display structures (for example, driving array, common electrode, pixel electrode, and color filter) on the base substrate 1, as the manufacturing method of these display structures are known and various, detail description thereof is omitted here.

The base substrate 1 is preferably formed of flexible material.

S02, applying biphenyl monomers on the base substrate 1 on which the step S01 has been performed.

Specifically, a solution may be made by resolving the biphenyl monomers into solvent and then applied onto the substrate by spraying, wherein the solvent may be alkane solvent (for example, cyclohexane), aromatic solvent (e.g., toluene) and the like, and mass percent concentration of the biphenyl monomers is preferably 85~95%.

Of course, directly applying the biphenyl monomers onto the base substrate 1 by spin coating is also feasible.

Preferably, the biphenyl monomer is above biphenyl monomer, the general formula of which is:

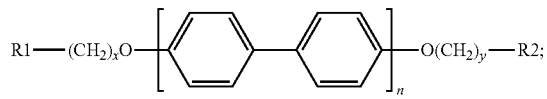

wherein, n is an integer selected from 1 to 3, x and y are integers selected from 1 to 7 respectively, and R1 and R2 are selected from —CH=CH$_2$, —OCH$_2$CH=CH$_2$, —CH$_2$NH$_2$, —CH$_2$COOH respectively.

S03, applying an electric field parallel to the base substrate 1 to the biphenyl monomers, so that the biphenyl monomers are polymerized into the biphenyl polymer layer 2.

Preferably, after the biphenyl monomers are polymerized into the biphenyl polymer layer 2 by means of the electric field parallel to the base substrate 1, in an initial state of the liquid crystal molecules which contact the biphenyl polymer layer 2, the liquid crystal molecules are also parallel to the base substrate 1.

The morphology of polymer network of the formed biphenyl polymer layer 2 relates to parameters of the electric field: if the frequency of the electric field is low, the polymerized biphenyl monomers diffuse fast, the polymer network is loose and the mesh is relative large; and the electric field of a high frequency hampers the diffusion of the polymerized biphenyl monomers, so that the polymer network is compact and the mesh is relative small. Therefore, proper morphology of polymer network can be obtained by selecting proper parameters of the electric field, so that the liquid crystal molecules may be optimally distributed. As above, the aperture size of the mesh of the biphenyl polymer layer 2 may preferably be 10±2 μm, in order to obtain such aperture, the parameters of the electric field are preferably as follows:

the frequency of the electric field is 400~800 Hz;
the electric field intensity is 0.75~1.25V/cm; and
the polymerization time is 180~220 s.

S04, immersing the biphenyl polymer layer 2 into suspensions of metal nanoparticles 3 (for example, the base substrate 1 may be completely immersed), so that metal nanoparticles 3 are distributed in a dispersed manner on the skeleton of the biphenyl polymer layer 2, thereby a bistable liquid crystal display panel can be obtained.

That is to say, the base substrate 1 may be immersed into the suspensions of metal nanoparticles 3, so that the metal nanoparticles 3 may be self-assembled to the biphenyl polymer layer 2.

For example, the concentration of the metal nanoparticles 3 in the suspensions is 0.9~1.1 mol/L, and the immersing time is 4.5~5.5 h.

For example, the metal nanoparticles 3 include at least one of gold nanoparticles, silver nanoparticles and platinum nanoparticles.

For example, the grain size of the metal nanoparticle 3 is 4~6 nm.

According to above method and parameters, bistable liquid crystal display substrates may be respectively manufactured by different biphenyl monomers at different parameters. A bistable liquid crystal display panel may be obtained by aligning and assembling two bistable liquid crystal display substrates manufactured by the same method and then implanting cholesteric liquid crystal therebetween (display structures on the two display substrates in each display panel are different, and the electric field for forming the biphenyl polymer layer 2 of the two display substrates are preferably parallel and opposite in direction). Then transmittances in light state (which corresponds to the focal conic texture structure) and transmittances in black state (which corresponds to the planar texture structure) of the bistable liquid crystal display panels are tested. After the test, it can be found that the bistable liquid crystal display panel formed by display substrate manufactured according to the method in the embodiment has a transmittance in black state of 0.8~0.9%, and a transmittance in light state of 75~80%. In contrast, the conventional bistable liquid crystal display panel generally has a transmittance in black state more than 1%, and a transmittance in light state below 70%.

It can be seen that the display substrate in the invention can improve the distributions of the liquid crystal molecules in light state and black state simultaneously, and reduce the transmittance in black state of the bistable liquid crystal display panel and increase the transmittance in light state thereof, thereby contrast of the display panel can be increased and display effect thereof can be improved.

Embodiment 2

As shown in FIG. 2, the present embodiment provides a bistable liquid crystal display panel comprising a first display substrate and a second display substrate which are aligned and assembled, and a liquid crystal layer provided between the first display substrate and the second display substrate, wherein the first display substrate is the above display substrate, and a biphenyl polymer layer 2 of the first display substrate faces the liquid crystal layer (that is, the biphenyl polymer layer 2 of the first display substrate contacts the liquid crystal layer), and/or the second display substrate is the above display substrate, and a biphenyl polymer layer 2 of the second display substrate faces the liquid crystal layer (that is, the biphenyl polymer layer 2 of the second display substrate contacts the liquid crystal layer).

That is to say, at least one of the first display substrate and the second display substrate of the bistable liquid crystal display panel according to the present embodiment is the above display substrate of the invention, and the biphenyl polymer layer 2 thereof faces the liquid crystal layer of the bistable liquid crystal display panel (that is, contacts the liquid crystal molecules 4), thereby the distribution of the liquid crystal molecules 4 can be improved, so that the transmittance in light state becomes higher, and the transmittance in black state becomes lower, thereby the contrast is increased.

Of course, the first display substrate and the second display substrate of a bistable liquid crystal display panel are different, for example, one of the display substrates may be used as a driving substrate, and the other may be used as a color filter substrate, which will not be described in detail here.

Preferably, both of the first display substrate and the second display substrate are the display substrate of the invention, thereby an effect of optimally improving the distribution of the liquid crystal molecules 4 can be achieved. The liquid crystal molecules contacting the biphenyl polymer layer 2 of the first display substrate and the liquid crystal molecules contacting the biphenyl polymer layer 2 of the second display substrate are parallel and opposite in directions. In order to achieve this object, when both of the first display substrate and the second display substrate are the display substrates of the invention, the electric field for forming the biphenyl polymer layer 2 of the first display substrate and the electric field for forming the biphenyl polymer layer 2 of the second display substrate are parallel and opposite in directions with each other.

Preferably, the liquid crystal layer comprises cholesteric liquid crystal. The cholesteric liquid crystal is commonly used in bistable liquid crystal display device, and is especially suitable for the bistable liquid crystal display panel of the present invention.

Of course, for a bistable liquid crystal display panel, part of display structures thereof may be different from those in conventional display panel, for example, the bistable liquid crystal display panel may be driven by using a passive driving manner rather than using array of thin film transistors, furthermore, the bistable liquid crystal display panel may be provided with no polarization sheet (which implements display through switching between scattering and reflecting), alternatively, a polarization sheet wherein two polarized directions thereof are perpendicular with each other may be used (which is mainly used to improve visual effect in different view angles.)

Of course, the above display panel may also comprise other structures such as the base substrate 1, the metal nanoparticles 3, the frame sealing glue 6 etc., which will not be described in detail here.

It should be understood that, the above implementations are only used to explain principle of the present invention, but not to limit the present invention. The persons skilled in the art can make various variations and modifications without departing from the spirit and scope of the present invention, and these variations and modifications also drop within the protection scope of the present invention.

The invention claimed is:

1. A display substrate comprising a base substrate, and:
a biphenyl polymer layer provided on the base substrate;
wherein metal nanoparticles are distributed on the biphenyl polymer layer dispersedly,
wherein the biphenyl polymer layer comprises a skeleton having a thickness of 1~2 μm, and meshes formed in the skeleton, and the meshes are uniformly distributed in the skeleton, each mesh having an aperture size of 10±2 μm, and
wherein the biphenyl polymer layer is formed by polymerization of biphenyl monomers under the influence of an electric field parallel to the base substrate, in the absence of the metal nanoparticles and without the biphenyl monomers contacting liquid crystal molecules,
wherein the electric field directly controls the size of the meshes and their uniform distribution in the skeleton.

2. The display substrate of claim 1, wherein the display substrate is a flexible display substrate.

3. The display substrate of claim 1, wherein
the metal nanoparticles are provided on the skeleton.

4. The display substrate of claim 3, wherein
the metal nanoparticles include at least one of gold nanoparticles, silver nanoparticles and platinum nanoparticles.

5. The display substrate of claim 3, wherein the grain size of the metal nanoparticle is 4~6 nm.

6. The display substrate of claim 1, wherein the general formula of biphenyl monomers forming the biphenyl polymer is:

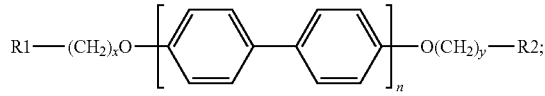

wherein, n is an integer selected from 1 to 3, x and y are integers selected from 1 to 7 respectively, and R1 and R2 are selected from —CH=CH$_2$, —OCH$_2$CH=CH$_2$, —CH$_2$NH$_2$, —CH$_2$COOH respectively.

7. A bistable liquid crystal display panel comprising a first display substrate and a second display substrate which are aligned and assembled, and a liquid crystal layer provided between the first display substrate and the second display substrate, wherein
the first display substrate is the display substrate of claim 1, and the biphenyl polymer layer of the first display substrate faces the liquid crystal layer,
and/or
the second display substrate is the display substrate of claim 1, and the biphenyl polymer layer of the second display substrate faces the liquid crystal layer.

8. The bistable liquid crystal display panel of claim 7, wherein
the liquid crystal layer comprises cholesteric liquid crystal.

9. A manufacturing method of a display device comprising:
applying biphenyl monomers on a base substrate; and
applying an electric field parallel to the base substrate to the biphenyl monomers, so that the biphenyl monomers are polymerized into a biphenyl polymer layer in the absence of metal nanoparticles and without contacting liquid crystal molecules, and
distributing metal nanoparticles on the biphenyl polymer layer dispersedly,
wherein the biphenyl polymer layer comprises a skeleton having a thickness of 1~2 μm, and meshes formed in the skeleton,
wherein the meshes are uniformly distributed in the skeleton, each mesh having an aperture size of 10±2 μm,
wherein the electric field directly controls the size of the meshes and their uniform distribution in the skeleton.

10. The manufacturing method of a display device of claim 9, comprises as the step of distributing metal nanoparticles on the biphenyl polymer layer dispersedly:
immersing at least the biphenyl polymer layer into suspensions of metal nanoparticles, so that the metal nanoparticles are distributed on the biphenyl polymer layer in a dispersed manner.

11. The manufacturing method of a display device of claim 10, wherein
the metal nanoparticles include at least one of gold nanoparticles, silver nanoparticles and platinum nanoparticles.

12. The manufacturing method of a display device of claim 10, wherein
the grain size of the metal nanoparticle is 4~6 nm.

13. The manufacturing method of a display device of claim 10, wherein
the concentration of the metal nanoparticles in the suspensions is 0.9~1.1 mol/L; and
the immersing time is 4.5~5.5 h.

14. The manufacturing method of a display device of claim 9, wherein
the general formula of biphenyl monomers forming the biphenyl polymer is:

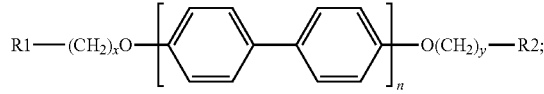

wherein, n is an integer selected from 1 to 3, x and y are integers selected from 1 to 7 respectively, and R1 and R2 are selected from —CH=CH$_2$, —OCH$_2$CH=CH$_2$, —CH$_2$NH$_2$, —CH$_2$COOH respectively.

15. The manufacturing method of a display device of claim 9, wherein
the frequency of the electric field is 400~800 Hz;
the electric field intensity is 0.75~1.25V/cm; and
the polymerization time is 180~220 s.

* * * * *